United States Patent Office 3,425,478
Patented Feb. 4, 1969

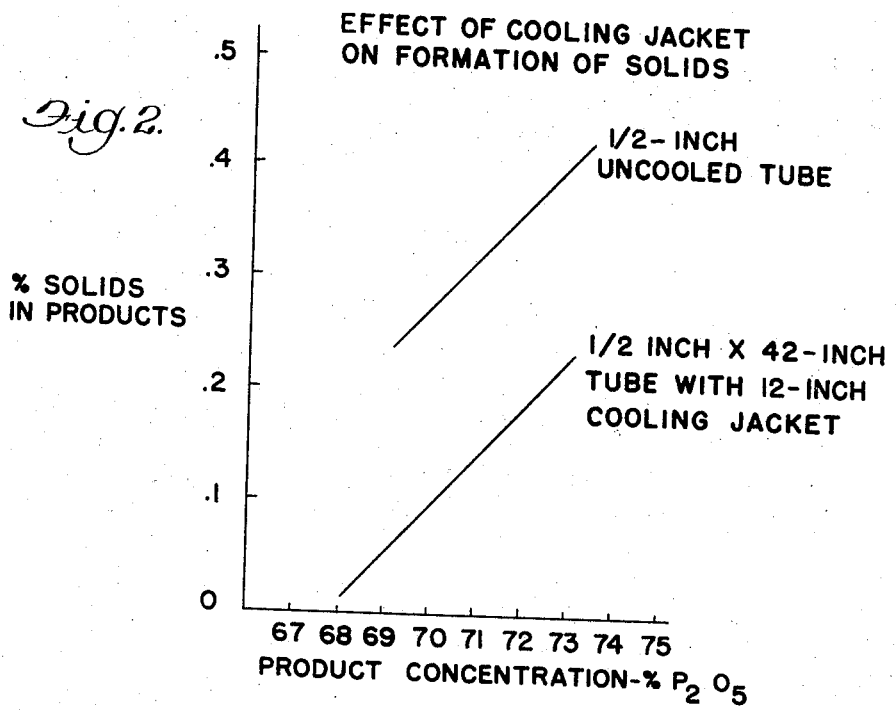
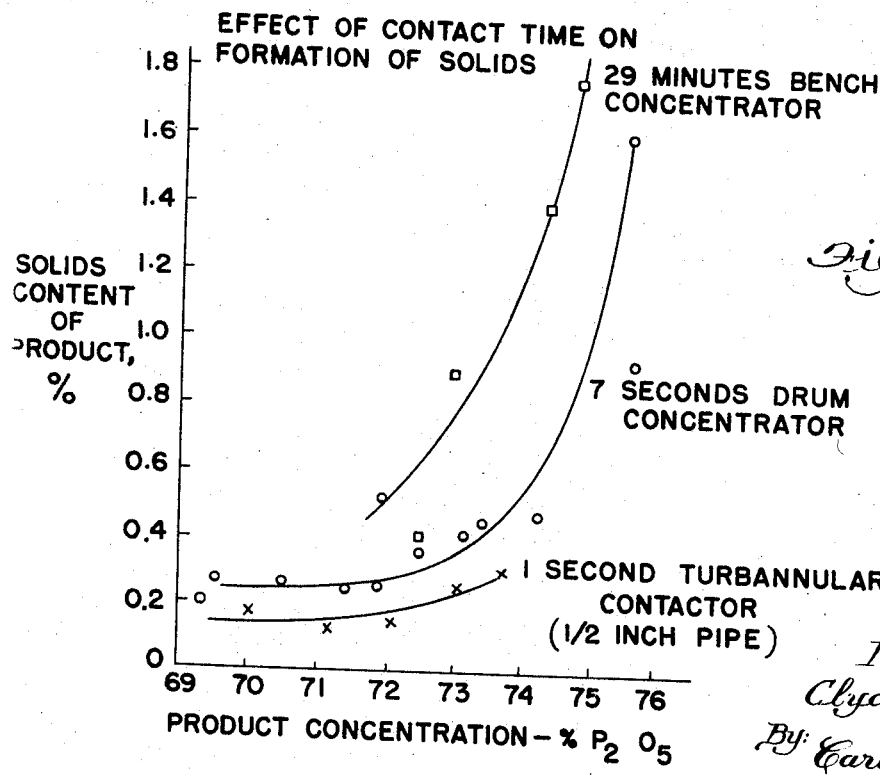

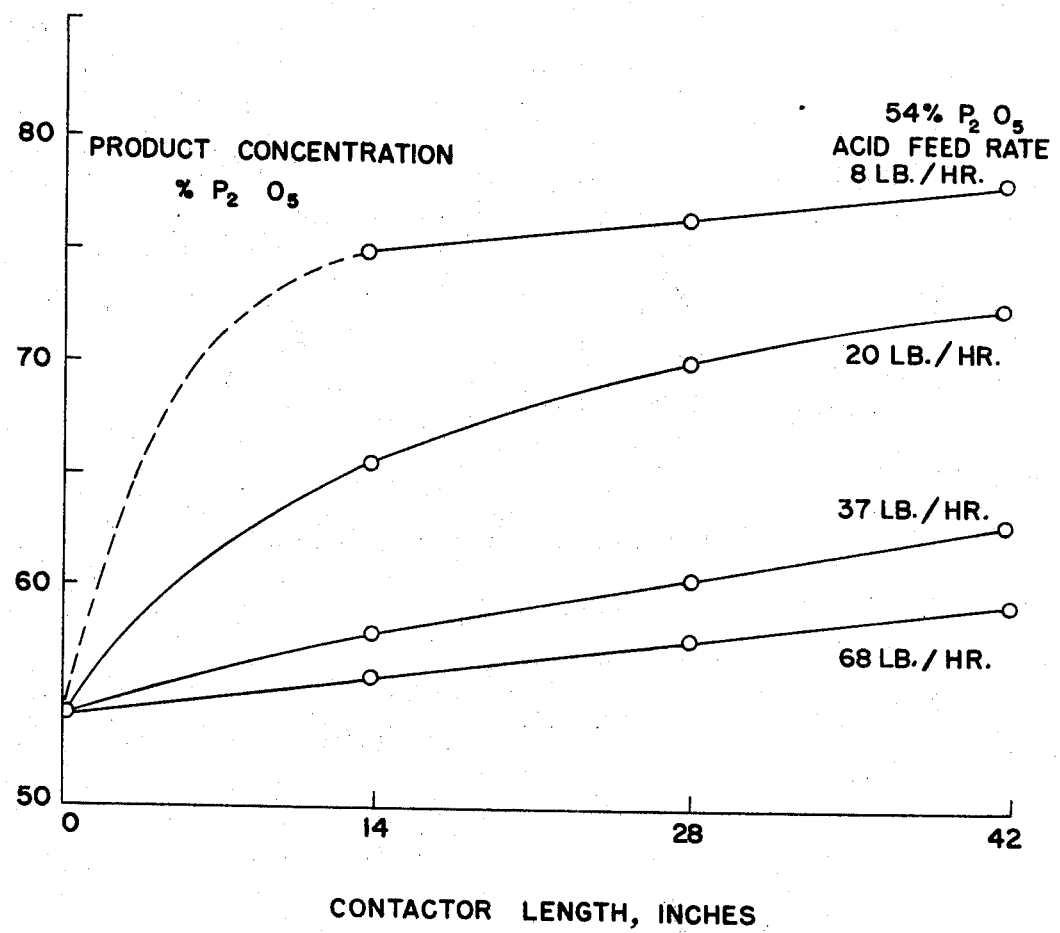

3,425,478
CONCENTRATION OF PHOSPHORIC ACID
Clyde Reeder, 1884 Mason Mill Road,
Decatur, Ga. 30033
Continuation-in-part of application Ser. No. 448,801,
Apr. 16, 1965. This application Dec. 11, 1967, Ser.
No. 689,625
U.S. Cl. 159—48                              3 Claims
Int. Cl. C01b 25/24

ABSTRACT OF THE DISCLOSURE

In the concentration of wet process phosphoric acids by heating the acids with hot combustion gases, the formation of insoluble by-products or solids is avoided or reduced to a minimum by passing the hot combustion gases through a short tube which is unheated from without and which is cooled at the inlet end, introducing the wet process phosphoric acid into the cooled portion of the tube for travel in cocurrent flow with the gases through the remainder of the tube which is free of external heat whereby the acid throughout its travel avoids contact with externally heated metal surfaces and the heated acid is discharged into an enlarged expansion vessel or separation zone in which the combustion gases and evolved vapor rise and are drawn off and the acid product collected in the lower portion of the vessel.

BACKGROUND AND SUMMARY

Figure 1:
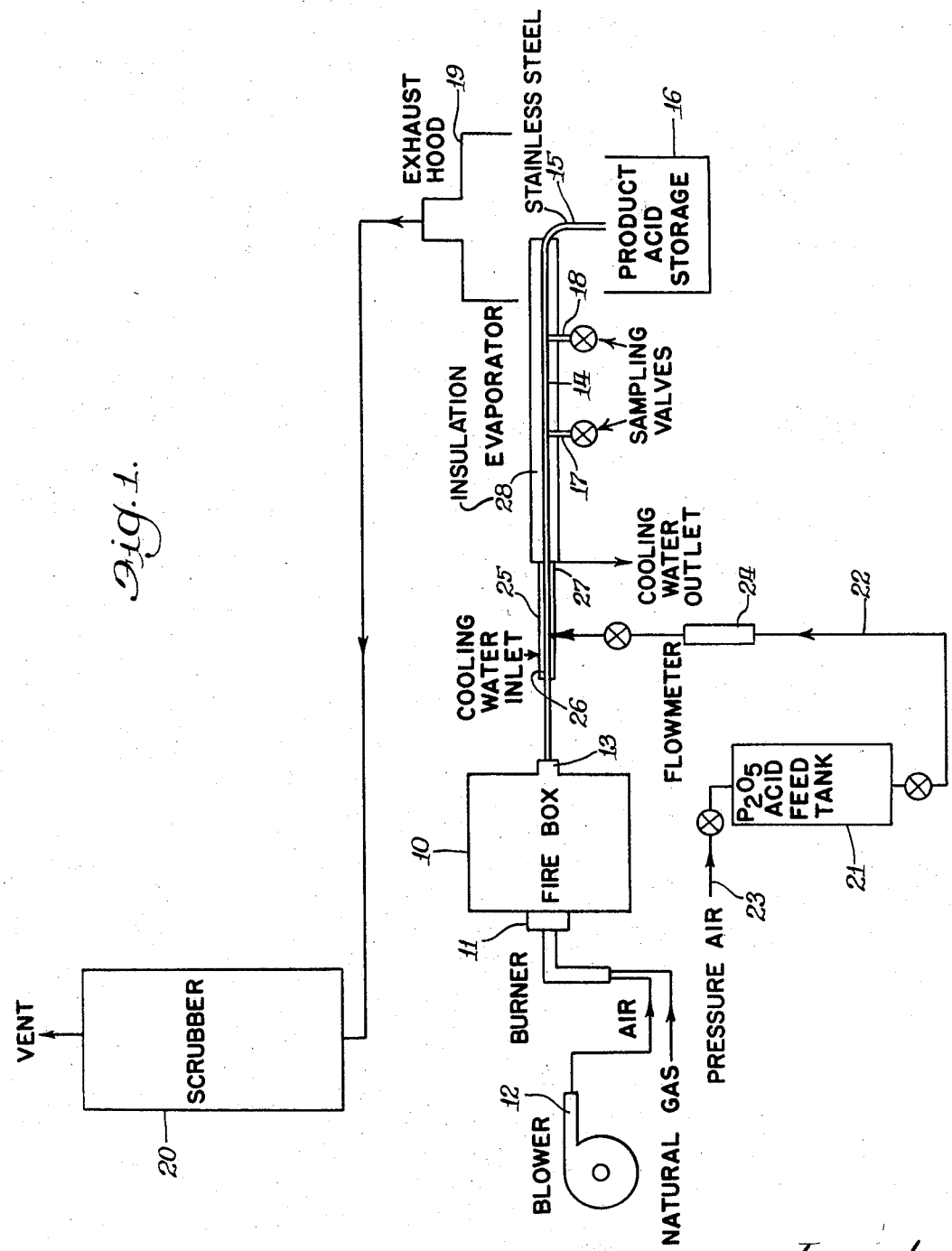

Present-day methods for concentrating and condensing aqueous phosphoric acid involve use of submerged-combustion evaporators. Such evaporators are relatively large, complex and expensive. Undesirable insoluble by-products form in the evaporators as a result of the relatively long hold time of liquid in contact with over-heated surfaces. Thermal efficiency is relatively low because of the extremely short contact time of hot gas with the liquid. Wet process phosphoric acid contains impurities such as iron and aluminum and other metal impurities together with organic material and the impurities may be from 1 to 15% by weight. Such impurities, when brought in contact with over-heated metal surfaces, form metal phosphate solids which later tend to settle out and constitute a substantial loss.

An object of the present invention is to provide for the concentration of phosphoric acid in equipment which is small and inexpensive and wherein concentration is effected in a modicum of time. A further object is to provide a process and means for the condensation of aqueous phosphoric acid in a brief treating period and with high thermal efficiency. A still further object is to provide a process wherein the solid surfaces of the equipment are at or below the temperature of the liquid while avoiding the need for external heating. Yet another object is to provide a process and apparatus wherein phosphoric acid and hot combustion gases are brought together in cocurrent flow and wherein cooling of the conduit or contactor tube is employed, at least about the area where the gases and acid come together and begin their cocurrent flow. A still further object is to provide a process wherein a contactor tube is employed as the main means for concentration of the acid and in which steps are employed for keeping the tube substantially free of solids and wherein the solids content of the product is reduced to a minimum. Other specific objects and advantages will appear as the specification proceeds.

By cooling a relatively short tube at its inlet end and then passing hot combustion gases through the tube and avoiding external heating of the tube, I find that the wet process phosphoric acid can be passed into the cooled end of the tube so as to flow cocurrently with the gases through the unheated tube and the discharged acid and gases separated in a vessel or separation zone, the liqiud product being recovered in the lower portion of the zone.

RELATED CASE

This application is a continuation-in-part of my co-pending application Ser. No. 448,801 filed Apr. 16, 1965 now abandoned.

DRAWINGS

The invention is shown in an illustrative embodiment by the accompanying drawings, in which—

FIG. 1 is a diagrammatic showing of apparatus which may be employed in the practice of the invention;

FIG. 2, a graph showing the effect of the cooling jacket on the formation of solids;

FIG. 3, a graph showing the effect of contact time on the formation of solids; and FIG. 4, a graph showing the effect of the contactor length and acid feed rate on product concentration.

DETAILED DESCRIPTION

In one embodiment of the invention, a stainless steel pipe is supported as shown in FIG. 1 and receives at one end the hot products of combustion from a fire box, and into the pipe near the inlet is introduced phosphoric acid which then flows in cocurrent flow through the pipe. The concentrated acid product is discharged preferably into a vessel from which the evolved water vapor and combustion gases rise and may be collected.

Referring to FIG. 1 of the drawings, 10 designates a fire box provided with a burner nozzle 11. To the burner is supplied a combustible gas, such as natural gas (methane, propane, etc.), and a blower 12 introduces the proper amount of air for efficient combustion. Communicating with the outlet 13 of the fire box is a contactor pipe or tube 14 which may be formed of stainless steel and which may be of relatively short length, such as, for example 5 feet or 42 inches, the end of the tube being directed as indicated at 15 into vessel 16. Draw-off lines equipped with valves are shown at 17 and 18 so that samples may be withdrawn at these points if desired.

Above the open vessel 16 is supported an exhaust hood 19 with a conduit leading to a scrubber 20 where condensable and water-soluble pollutants are removed.

Phosphoric acid from the feed tank 21 is passed through feed line 22 by means of air pressure from line 23, through flow meter 24 and into the pipe 14 where it meets the combustion gases for cocurrent flow through pipe 14.

In the specific illustration given, I provide a cooling jacket 25 about the inlet portion of the pipe 14, the jacket having an inlet 26 and an outlet 27 and through which cooling water or other fluid may be passed. In the specific illustration given, the jacket 25 extends for 12 inches along the contactor tube 14 which has a horizontal length of 42 inches, and the feed acid enters the pipe at a point about 10 inches from the inlet so that the cooling jacket continues to cool the tube 14 for two inches through which the gases and acid flow cocurrently. I prefer to provide the remainder of the pipe 14 with an insulation 28, as shown in FIG. 1.

The tubular contactor or evaporator 14 may be of any suitable material and may be of any suitable dimensions. By way of illustration, in the test apparatus shown in FIG. 1, the evaporator was constructed from type 316 stainless steel pipe, ½ inch S/40 by 42 inches long. In some of the test operations, insulated ½ inch and one inch Schedule 40 stainless steel pipes 5 feet long were employed. It will be understood that substantial variations can be made in the size and length of the pipe employed as the evaporator. I prefer to use such a length as will cause the hot combustion gases and the feed acid to reach temperatures which are fairly near to each other at the point of exit from the tube. The heat efficiency is high since the average thermal driving force is greater than in a submerged-combustion evaporator, and the temperature difference between exiting gas and liquid can be reduced by proper selection of tube length and flow rates.

The hot combustion gases from the fire box 10 together with the acid feed may be passed through the evaporator or contactor pipe 14 in a matter of seconds, and preferably at a time less than one second, and in ½ or 1 inch pipes of short length, such as 3 to 5 or 6 feet long, it is found that the exiting temperatures of the gas and liquid fairly closely approach each other. The temperature of the incoming combustion gases normally exceeds 2000° F. and approaches 3000° F. If desired, this temperature may be tempered with cooling air to bring the temperature entering pipe 14 into the range of 500° to 2000° F., and the results appear to be about the same whether tempering air is used or untempered hot combustion gases are employed.

For cooling the inlet portion of pipe 14 over the area in which the gas and acid come together and begin their cocurrent flow, cooling water or other fluid may be used. If desired, the feed acid itself at about room temperature may be utilized in jacket 25 as the cooling liquid, and the preheated feed acid may then be passed through line 22 into pipe 14 for concentration.

Specific examples illustrative of the invention may be set out as follows:

Example I

Wet process 54 percent phosphoric acid and hot gases from the combustion of methane were passed in cocurrent, turbulent flow through an insulated ½ inch Schedule 40 stainless steel pipe 5 feet long. No cooling jacket was employed.

At a feed rate of 15 to 45 pounds per hour, the liquid had an outlet temperature of 410° F. The gas had a flow rate (s.c.f.h. of $CH_4$) of 10 and an outlet temperature exceeding 400° F. The product had a $P_2O_5$ equivalent of 67.7 weight percent $P_2O_5$ on a total composition basis.

Example II

The process was carried out as described in Example I except that the pipe was a one inch stainless steel pipe. The liquid flow rate was 7.4 pounds per hour and the outlet temperature was 510° F. The gas flow rate (s.c.f.h. of $CH_4$) was 27.6 and outlet temperature was 510° F. The product had a $P_2O_5$ equivalent of 80.6 weight percent $P_2O_5$ on a total composition basis.

Example III

Tests were carried out in a ½ inch S/40 by 42 inch long 316 stainless steel pipe. Food grade 54 percent $P_2O_5$ acid was introduced with combustion gases, as shown in FIG. 1, and concentrated to the superphosphoric acid range.

The tests were carried out both with the use of tempering air added to the combustion gas and also with the undiluted hot gas with very nearly the same results. Nearly quantitative yields, based on $P_2O_5$ equivalent, were obtained when food grade acid was concentrated to 59 percent, 63 percent and 78 percent $P_2O_5$ equivalent.

Example IV

The process was carried out in the apparatus described in Example III and as shown in FIG. 1 but with the use of cooling water at the inlet, as shown in FIG. 1. A section of the evaporator pipe wall was cooled for a distance of one foot. Combustion gases passed through a ten-inch section of the cooled pipe and then mixed with the cold feed acid. The hot mixture then passed through a cooled two-inch length of the evaporator pipe before flowing through the uncooled insulated contactor pipe. After an eight-hour run, it was found that the contactor pipe was essentially free of solids. In addition, the solids content of the product was reduced significantly as shown by the comparative data plotted on FIG. 2.

Thermal efficiency was unaffected by use of the cooling jacket. Instead of water, feed acid may be used as coolant prior to passing into the evaporator, and heat transferred from the combustion gases to the cooler serves to preheat the acid.

In the tests which are set out in the following Table I, food grade 54 percent $P_2O_5$ acid was concentrated in the evaporator shown in FIG. 1. The acid was exposed to a high temperature for less than one second and relatively few solids precipitated.

TABLE I

| Liquid | | Combustion Gas Flow Rate, s.c.f.h. | | Product Composition, percent | |
|---|---|---|---|---|---|
| Feed Rate, lb./hr. | Discharge Temp., °F. | of $CH_4$ | of Air | $P_2O_5$ | Insoluble |
| 7.9  | 640 | 33   | 445   | 78.2 | 0.6 |
| 9.7  | 580 | 36   | 600   | 76.2 | 0.4 |
| 9.7  | 580 | 36   | 600   | 75.5 | 0.4 |
| 8.8  | 480 | 24   | 480   | 72.3 | 0.4 |
| 8.8  | 460 | 33   | 570   | 73.9 | 0.3 |
| 8.8  | 440 | 33   | ----- | 73.2 | 0.2 |
| 12.3 | 460 | 37.5 | 750   | 72.1 | 0.1 |
| 7.4  | 510 | 27.6 | ----- | 80.6 | 0.2 |
| 8.8  | 320 | 54   | 2,040 | 73.4 | 0.3 |
| 8.8  | 350 | 60   | 2,361 | 74.1 | 0.3 |
| 12.3 | 350 | 60   | 2,361 | 73.0 | 0.3 |
| 8.8  | 520 | 54   | 2,100 | 73.1 | 1.0 |

FIG. 3 shows the effect of contact time on the formation of solids based on the results obtained in Example IV in which the ½ inch pipe (turbannular contactor) is employed. The figure also shows comparative results obtained by a bench concentrator. A bench concentrator or laboratory scale continuous evaporator consists simply of a metal vessel into which the liquid phosphoric acid is introduced and the vessel is then heated externally by a gas burner to bring about concentration, the dilute 54 percent $P_2O_5$ phosphoric acid being continuously introduced into the vessel and the concentrated acid being received as overflow. The principle of operation is substantially that of submerged gas-type concentration except that instead of using combustion gases to heat the feed, an external gas burner is the heating means employed. FIG. 3 also shows by way of comparison a seven-second operation in which the phosphoric acid is concentrated upon a drum which is internally heated. The 54 percent $P_2O_5$ phosphoric acid is applied as a thin film on the drum surface and the water is evaporated as the heated drum revolves. The concentrated acid is scraped from the drum by a scraper after traveling from the point of application on one side of the drum to a point diametrically opposite.

FIG. 4 shows the effect of the pipe contactor length and the acid feed rate on product concentration. The results of the tests set out in Table I are plotted on FIG. 4. The acid was sampled at various points along the length of the evaporator to show the effect of contactor length (contact time) on acid concentration when the acid feed rate was varied.

In the foregoing process, the wet process phosphoric acid meets no highly heated surface at any point. The inlet portion of the tube is cooled and the remainder of the tube through which the gases and acid travel in cocurrent flow receives no external heat. The combustion gases having a temperature in the range of 500–3000° F. (preferably in the range of about 1000–2000° F.) raises the temperature of the incoming wet process phosphoric acid having a temperature in the neighborhood of room temperature to an exit temperature of about 350–640° F. as shown in Example IV so that at the time of discharge, the feed acid reaches a temperature which is fairly near to the temperature of the exiting combustion gases. The liquid acid tends to flow along the interior sides of the tube thus keeping the tube walls cool and since there is no external heat applied to the tube, there is no exposure of the acid to over-heated metal surfaces at any point along its travel. As a result, and as shown best in Table I of Example IV, there is a minimum of solids formation in the process.

While in the foregoing specification I have set forth specific examples in considerable detail which are illustrative of the invention, it will be understood that such detail or details may be varied widely by those skilled in the art without departing from the spirit of my invention.

I claim:

1. In a process for concentrating wet process phosphoric acid, the steps of passing a coolant exteriorly around the inlet end of a concentrator tube, passing hot combustion gases into said inlet end and through said tube, passing wet process phosphoric acid into the cooled end of said tube into contact with said gases for cocurrent flow therewith through said tube while maintaining said tube free of external heat, discharging the heated acid having a temperature of about 350–640° F. into an enlarged separation zone in which the combustion gases and evolved water vapors rise and are drawn off, and collecting the acid product in the lower portion of the zone.

2. The process of claim 1 in which the cocurrent flow of the acid with the hot combustion gases through the tube is for a time interval less than one second.

3. The process of claim 1 in which the discharged stream of gases and acid are directed downwardly into the separation zone and toward liquid acid product in the bottom of said zone.

References Cited

UNITED STATES PATENTS 3,361,187   1/1968   Hudson et al. _____ 159—49

NORMAN YUDKOFF, *Primary Examiner.*

J. SOFER, *Assistant Examiner.*

U.S. Cl. X.R.

23—165, 307; 159—16, 4